US008523295B2

(12) United States Patent
Bareiss et al.

(10) Patent No.: US 8,523,295 B2
(45) Date of Patent: Sep. 3, 2013

(54) HYDRAULIC ASSEMBLY FOR A HYDRAULIC VEHICLE BRAKE SYSTEM WITH TRACTION CONTROL

(75) Inventors: Alexander Bareiss, Immenstadt (DE); Andreas Weh, Sulzberg (DE); Tomoya Ideguchi, Tokyo (JP)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 12/681,462

(22) PCT Filed: Sep. 18, 2008

(86) PCT No.: PCT/EP2008/062450
§ 371 (c)(1),
(2), (4) Date: Apr. 2, 2010

(87) PCT Pub. No.: WO2009/047099
PCT Pub. Date: Apr. 16, 2009

(65) Prior Publication Data
US 2010/0276925 A1    Nov. 4, 2010

(30) Foreign Application Priority Data
Oct. 2, 2007 (DE) .................... 10 2007 047 124

(51) Int. Cl.
*B60T 8/36* (2006.01)
(52) U.S. Cl.
USPC ................................ 303/119.3; 303/DIG. 10
(58) Field of Classification Search
USPC ....................................... 303/119.3, DIG. 10
See application file for complete search history.

(56) References Cited

U.S. PATENT DOCUMENTS

| 7,204,566 | B2 * | 4/2007 | Otomo et al. | 303/119.3 |
| 7,500,725 | B2 * | 3/2009 | Otomo et al. | 303/119.3 |
| 2007/0096553 | A1 | 5/2007 | May et al. | |

FOREIGN PATENT DOCUMENTS

| DE | 10037842 A1 | 8/2001 |
| DE | 10053991 A1 | 5/2002 |
| DE | 10145540 A1 | 2/2003 |
| DE | 10228424 A1 | 8/2003 |
| DE | 10237163 A1 | 2/2004 |
| DE | 10339882 A1 | 1/2005 |
| DE | 102005005390 A1 | 5/2006 |
| EP | 1251052 A2 | 10/2002 |
| JP | 2002347595 A | 12/2002 |
| WO | 2004113142 A1 | 12/2004 |

* cited by examiner

*Primary Examiner* — Thomas J Williams
(74) *Attorney, Agent, or Firm* — Maginot, Moore & Beck

(57) ABSTRACT

The invention relates to a hydraulic assembly of a vehicle brake system with traction control. Hydraulic assemblies include a housing block, which is to be fitted with hydraulic components, and an electronic control unit for activating the components. It is known for a hydraulic connection for a pressure sensor to be provided on a housing block and for the signal of the pressure sensor to be taken into consideration for brake pressure regulation in the control unit. The invention proposes an advantageous arrangement of at least one second hydraulic connection for a second pressure sensor on the housing block in combination with blind bores of the hydraulic connections. The blind bores can be positioned in a variable fashion and formed with different lengths during the production of the housing block. In this way, it is possible for the pressure in different hydraulic partial regions of a vehicle brake system to be sensed in an application-specific manner. The number of such hydraulic connections for pressure sensors has no influence on the external dimensions of the housing block.

18 Claims, 1 Drawing Sheet

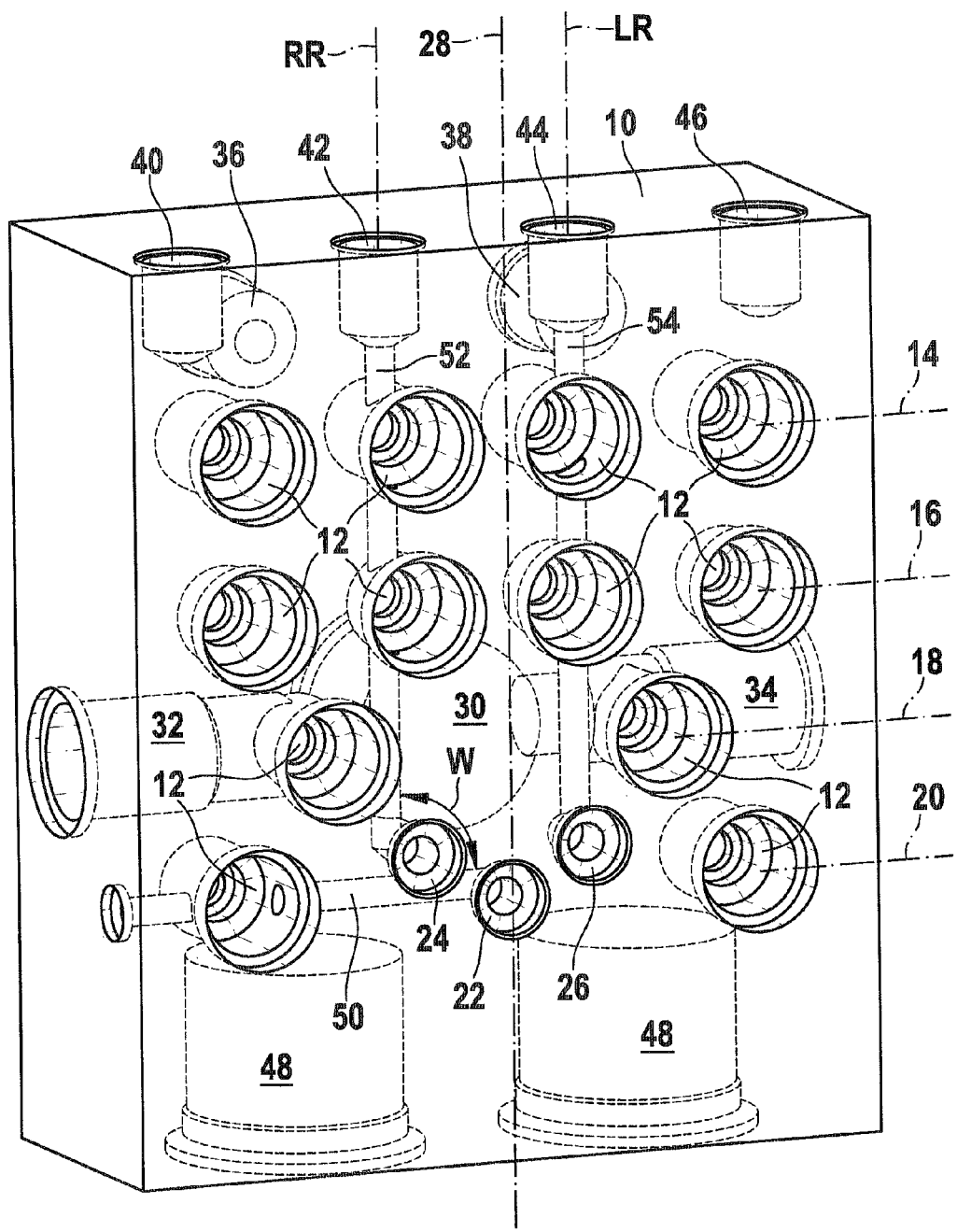

HYDRAULIC ASSEMBLY FOR A HYDRAULIC VEHICLE BRAKE SYSTEM WITH TRACTION CONTROL

CROSS-REFERENCE TO RELATED APPLICATION

This application is a 35 USC 371 application of PCT/EP2008/062450 filed on Sep. 18, 2008.

BACKGROUND OF THE INVENTION

1. Field of the Invention

The invention is based on a hydraulic assembly for a vehicle brake system with traction control.

2. Description of the Prior Art

Hydraulic assemblies for vehicle brake systems with traction control comprise a housing block and an electronic control unit. The housing block has many recesses for hydraulic components, such as solenoid valves, pumps or reservoirs. Connections for the wheel brakes of a vehicle brake system and for a master cylinder of a vehicle brake system are also embodied on the housing block. Bores in the interior of the housing block make hydraulic connections among these receptacles. The components are typically interconnected in two separate brake circuits. A housing block embodied in this way is known for instance from German Patent Disclosure DE 102 37 163 A1.

The aforementioned electronic control unit evaluates signals from sensors at the wheels of the vehicle, which each detect the prevailing slip conditions, and from sensors at the brake pedal of the master cylinder that detect its actuation and the scope of that actuation. In the control unit, the arriving signals are further processed into trigger signals. With these trigger signals, among other things the solenoid valves and the housing block are triggered, in order to regulate the brake pressure appropriately as a function of the particular slip conditions at the wheels of the vehicle.

It is moreover known to provide the housing block with a single pressure sensor. Typically, this pressure sensor detects the pressure at one of the connections with a master cylinder and thus furnishes the control unit with a further signal for controlling a vehicle brake system. In the brochure *Fahrstabilisierungssysteme [Travel Stability Systems]* in the *Gelbe Reihe* [Yellow Series] by Robert Bosch GmbH, 2004 Edition, page 90, FIG. 1, a hydraulic assembly sold on a large scale shown in an exploded view. This hydraulic assembly has a pressure sensor 9 that is disposed away from an imaginary center axis through the housing block.

It is disadvantageous that with a single pressure sensor, exact conclusions about the pressure conditions of all the hydraulic portions of the vehicle brake system cannot be drawn. Computed or estimated models based on the single measured value involve a risk of error, which necessarily worsens the quality of control in such vehicle brake systems.

ADVANTAGES AND SUMMARY OF THE INVENTION

By comparison, a hydraulic assembly for a hydraulic vehicle brake system with traction control a housing block which is provided with at least one second connection for a second pressure sensor. Hydraulic contacting of the pressure sensors is made by means of blind bores extending in the interior of the housing block. These bores can be produced relatively simply at little expense. The external dimensions of the housing block are changed if at all only insignificantly by the additional connection. By the at least one second pressure sensor, a second portion of a vehicle brake system that is subjected to pressure can be sensed, and thus the quality of regulation in the vehicle brake system can be improved. The blind bores can vary in their disposition and lengths, and as a result, different hydraulic portions of the vehicle brake system can be sensed. This choice can be made specifically for a particular application and need not be fixed in final form until in the course of the metal-cutting machining of the housing block. The pressure sensors are mounted on a common exterior of the housing block, and that exterior is also suitable for mounting the electronic control unit. This simplifies transmission of the signals from the pressure sensors to the electronic controller.

It is even feasible to dispose a further, second connection for an additional second pressure sensor in such a way, without having to increase the external dimensions of the housing block. For the manufacturers of motor vehicles, compact dimensions of the housing block make a powerful argument, since the available installation spaces in vehicles are intrinsically limited.

Further advantages or advantageous refinements of the invention will become apparent from the dependent claims or from the ensuing description.

BRIEF DESCRIPTION OF THE DRAWING

The invention is described in further detail below in conjunction with the accompanying drawing, in which:

FIG. 1, in a perspective view, shows a housing block of a hydraulic assembly along with its bores and recesses, in a preferred installed position.

DESCRIPTION OF THE PREFERRED EMBODIMENT

The housing block 10 of a hydraulic assembly, shown in the drawing, comprises a metal block, in which many recesses have been made by metal-cutting machining. Each of these recesses discharges at one of the exteriors of the housing block 10 and ends in the form of a blind bore in the interior of the housing block 10. The various recesses are hydraulically interconnected to form brake circuits, by means of bores extending horizontally and vertically in the interior of the housing block 10.

The drawing shows a view at the front side of a housing block 10. This front side may be intended for later securing the electronic control unit to it. A total of twelve identical circular valve bores 12 discharge to the outside at the front side. These valve bores 12 are distributed in four parallel, horizontal rows 14, 16, 18, 20, which are disposed at different levels. In an ensuing assembly process, solenoid valves are inserted into the valve bores 12.

On the front side of the block, hydraulic connections 22, 24, 26 can also be seen. These connections 22-26 are located in the lower third of the housing block 10. A first connection 22 is disposed between the two valve bores 12 of the fourth row 20 on a center axis 28 extending vertically through the housing block 10. The connections 24 and 26 are raised compared to the first connection 22, being disposed in the region between the third row 18 and the fourth row 20 of valve bores 12. These so-called second connections 24, 26 are placed laterally offset with respect to the center axis 28. They are approximately in alignment below the two inner valve bores 12. All three connections 22-26 form the corner points of an imaginary triangle, so that there is both a horizontal and a vertical spacing between the first connection 22 and each of the second connections 24, 26. The connections 22-26 are equipped with pressure sensors (not shown) at a later time.

On the back side of the housing block 10, located opposite the front side and toward the back in the drawing, a drive chamber 30 can be seen, which is intended for receiving a pump drive. This drive chamber 30 is located in the drawing above the two second connections 24 and 26 for pressure sensors, approximately at the level of the third row 18 of valve bores 12. Pump bores 32, 34 extend to both sides of this drive chamber 30. These pump bores are aligned with one another and extend horizontally through the housing block 10. The pump bores 32, 34 discharge to the outside toward the left and right exterior, respectively, of the housing block 10 and are intended for receiving pump elements, not shown, that are driven by the pump drive, also not shown, to execute a reciprocating stroke motion.

Two master cylinder connections 36, 38 extend to the outside toward the back side of the housing block 10. These connections are located directly below the top of the housing block 10. By these master cylinder connections 36, 38, a hydraulic line connection of the hydraulic assembly with a master cylinder is established, for actuation of a vehicle brake system by the driver.

Four wheel brake cylinder connections 40, 42, 44, 46 are provided, located side by side, on the top side of the housing block 10. They serve to connect brake lines that connect to wheel brakes of a vehicle brake system to the hydraulic assembly. The two inner wheel brake cylinder connections 42 and 44 are in contact for instance with the wheel brakes at the right rear (RR) and left rear (LR) of the vehicle.

On the underside of the housing block 10, opposite the top side, finally, two reservoir chambers 48 can also be seen, which are each associated with one of the brake circuits of a vehicle brake system.

With regard to the bores in the housing block 10 for hydraulically linking the aforementioned recesses with one another, these will be described below only to the extent necessary for understanding the invention. For technical production reasons, these bores extend horizontally or vertically in the housing block 10. These bores, whose functionally dictated the placement and embodiment on the housing block 10 are generally known prior art and will accordingly not be described in detail.

One essential feature for the invention, among others, is the hydraulic contacting, described below, of the connection 22-26 for the pressure sensors. This is effected by means of a respective blind bore 50, 52, 54 associated with one of the connections 22, 24, 26. All the blind bores 50-54 extend in a common sectional plane through the housing block 10. The associated connections 22-26 for the pressure sensors are each located in the surrounding of the inner, closed end of a respective one of the blind bores 50-54.

The first connection 22, disposed on the vertical center axis 28 through the housing block 10, is contacted by means of a first, horizontally oriented blind bore 50 that discharges to the exterior, on the left in the drawing, of the housing block 10. This first blind bore 50 penetrates a valve bore 12 in the lowermost, fourth row 20. This valve bore 12 is intended for receiving a so-called switchover valve. Inside a vehicle brake system, switchover valves have the function of controlling an existing hydraulic communication of one of the master cylinder connections 36, 38 with the wheel brake connections 40-46 of an associated brake circuit of the vehicle brake system. The first pressure sensor, to be disposed at the first connection 22, is accordingly capable of sensing the pressure level prevailing at the master cylinder connection 36.

In the course of further assembly of the hydraulic assembly, the first blind bore 50 is closed off from the surroundings. To that end, a ball is typically used, which is press-fitted into the housing block 10 in the discharge region of the blind bore 50.

The two second connections 24 and 26 for pressure sensors are hydraulically supplied via a respective second blind bore 52, 54. These second blind bores 52, 54 extend parallel to one another in the vertical direction. They are disposed with spacing on both sides from the center axis 28 of the housing block 10 and thus form a right angle W with the first blind bore 50 that leads to the first connection 22. The second blind bores 52, 54 discharge the two inner wheel brake connections 42, 44 at the top side of the housing block 10 and cross two respective valve bores 12, disposed one below the other, of the first row 14 and second row 16. Solenoid valves by way of which a pressure buildup in the wheel brakes can be controlled are located in the first row 14 of valve bores 12 that are oriented toward the top side of the housing block 10, while solenoid valves by way of which a pressure reduction in the corresponding wheel brake is effected are located in the second row 16 below the first. The pressure sensors associated with the second connections 24, 26 thus detect the pressure conditions at wheel brakes that preferably belong to different brake circuits of the vehicle brake system.

As explained, in the described embodiment of the invention, the first connection 22 for a pressure sensor communicates with the connection 36 of the master cylinder, while the two second connections 24, 26 are connected to the wheel brakes of different brake circuits. This contacting is merely an example. While maintaining the position of the described connections 22-26 for the pressure sensors, it is possible by a change in the direction in which they extend, in the horizontal or vertical positioning of the blind bores 50-54, and/or by varying the length to which these blind bores 50-54 extend, to establish pressure fluid communications with other hydraulic portions of a vehicle brake system. For instance, it would be conceivable for the respective second master cylinder connection 36 or 38 to be connected, instead of to a wheel brake connection 40-46, to at least one of the two second connections 24, 26. It is understood that not all three connections 22, 24, 26 for pressure sensors have to be provided. Often, sufficient improvement in the quality of regulation of a vehicle brake system for this particular use can be attained with only a single second connection 24 or 26 for a pressure sensor.

The foregoing relates to the preferred exemplary embodiments of the invention, it being understood that other variants and embodiments thereof are possible within the spirit and scope of the invention, the latter being defined by the appended claims.

The invention claimed is:

1. A hydraulic assembly for a vehicle brake system with traction control, comprising:
   a housing block having receptacles, provided on the housing block, the receptacles provided for receiving hydraulic components for regulating brake pressure at wheel brakes of the vehicle brake system;
   the housing block having bores, that carry pressure fluid and switch the receptacles to at least one brake circuit;
   the housing block having hydraulic connections for the wheel brakes of the vehicle brake system, for a master cylinder of the vehicle brake system, and having a first hydraulic sensor connection for a first pressure sensor that detects the hydraulic pressure in a hydraulic portion of the vehicle brake system; and
   at least one second hydraulic sensor connection for a second pressure sensor being embodied on the housing block, wherein the first and the second hydraulic sensor connections are each disposed on closed ends, located inward, of blind bores that carry pressure fluid, wherein the blind bores put the first and second hydraulic sensor connections into contact with different receptacles for solenoid valves for regulating the brake pressure, wherein the first hydraulic sensor connection is placed on a center axis extending vertically through the housing block and the at least one second hydraulic sensor connection is disposed on the housing block with horizontal spacing and with vertical spacing compared to the first hydraulic sensor connection, and wherein the blind bores for contacting the first and second hydraulic sensor connections form an essentially right angle with one another.

2. The hydraulic assembly as defined by claim 1, wherein each of the respective blind bores extends in a common sectional plane through the housing block and each of the respective blind bores is oriented horizontally and/or vertically.

3. The hydraulic assembly as defined by claim 1, wherein the respective blind bore of the at least one second hydraulic sensor connection hydraulically connects a respective wheel brake hydraulic connection with a first receptacle of the plurality of receptacles and a second receptacle of the plurality of receptacles, each of the first and second receptacles has a solenoid valve, the first receptacle is configured to receive a solenoid valve that controls pressure buildup in a respective wheel brake and the second receptacle is configured to receive a solenoid valve that controls pressure reduction of the respective wheel brake.

4. A hydraulic assembly for a hydraulic vehicle brake system with traction control, comprising:

a housing block having a plurality of receptacles defined therein, the receptacles being configured to receive hydraulic components for regulating brake pressure at wheel brakes of the vehicle brake system;

the housing block further defining a plurality of bores configured to carry pressure fluid and place the receptacles in fluid communication with at least one brake circuit;

the housing block further defining wheel brake hydraulic connections to the wheel brakes of the vehicle brake system and hydraulic master cylinder connections to a master cylinder of the vehicle brake system;

the housing block further defining a first hydraulic sensor connection for a first pressure sensor configured to detect hydraulic pressure in a hydraulic portion of the vehicle brake system; and the housing block also defining at least one second hydraulic sensor connection for a second pressure sensor, wherein a group of hydraulic sensor connections include the first hydraulic sensor connection and the at least one second hydraulic sensor connection, wherein each hydraulic sensor connection of the group of hydraulic sensor connections is disposed on a closed end of a respective blind bore of the plurality of bores, the respective blind bore being configured to carry pressure fluid, wherein the respective blind bore places a respective hydraulic sensor connection of the group of hydraulic sensor connections in fluid communication with a respective receptacle of the plurality of receptacles, wherein the first hydraulic sensor connection is defined on a center axis extending vertically through the housing block, and the at least one second hydraulic sensor connection is defined on the housing block with horizontal spacing and with vertical spacing compared to the first hydraulic sensor connection, and wherein the respective blind bore of the at least one second hydraulic sensor connection hydraulically connects a respective wheel brake hydraulic connection with a first receptacle of the plurality of receptacles and a second receptacle of the plurality of receptacles, each of the first and second receptacles has a solenoid valve, the first receptacle is configured to receive a solenoid valve that controls pressure buildup in the respective wheel brake and the second receptacle is configured to receive a solenoid valve that controls pressure reduction of the respective wheel brake.

5. The hydraulic assembly as defined by claim 4, wherein the first hydraulic sensor connection is disposed remote from the wheel brake hydraulic connections of the vehicle brake system, relative to the at least one second hydraulic sensor connection.

6. The hydraulic assembly as defined by claim 4, wherein each of the respective blind bores extends in a common sectional plane through the housing block and each of the respective blind bores is oriented horizontally and/or vertically.

7. The hydraulic assembly as defined by claim 4, wherein the first hydraulic pressure sensor and the at least one second hydraulic pressure sensor connection discharge toward a common exterior of the housing block.

8. The hydraulic assembly as defined by claim 4, wherein the receptacles are defined in a common exterior of the housing block.

9. The hydraulic assembly as defined by claim 4, wherein the first hydraulic sensor connection is in fluid communication with one of the hydraulic master cylinder connections on the housing block, and each of the at least one second hydraulic sensor connections is in fluid communication with one of the wheel brake hydraulic connections of the housing block.

10. The hydraulic assembly as defined by claim 4, wherein the first hydraulic sensor connection and the at least one second hydraulic sensor fluidly communicate with different hydraulic master cylinder connections.

11. The hydraulic assembly as defined by claim 4, wherein each hydraulic sensor connection of the group of hydraulic sensor connections is disposed on a closed end of only one respective blind bore.

12. A hydraulic assembly for a hydraulic vehicle brake system with traction control, comprising:

a housing block having a plurality of receptacles defined therein, the receptacles being configured to receive hydraulic components for regulating brake pressure at wheel brakes of the vehicle brake system;

the housing block further defining a plurality of bores configured to carry pressure fluid and place the receptacles in fluid communication with at least one brake circuit;

the housing block further defining wheel brake hydraulic connections to the wheel brakes of the vehicle brake system and hydraulic master cylinder connections to a master cylinder of the vehicle brake system;

the housing block further defining a first hydraulic sensor connection for a first pressure sensor configured to detect hydraulic pressure in a hydraulic portion of the vehicle brake system; and the housing block also defining at least one second hydraulic sensor connection for a second pressure sensor;

wherein a group of hydraulic sensor connections include the first hydraulic sensor connection and the at least one second hydraulic sensor connection, wherein each hydraulic sensor connection of the group of hydraulic sensor connections is disposed on a closed end of a respective blind bore of the plurality of bores, the respective blind bore being configured to carry pressure fluid, wherein the respective blind bore places a respective hydraulic sensor connection of the group of hydraulic sensor connections in fluid communication with a respective receptacle of the plurality of receptacles, wherein the first hydraulic sensor connection is defined on a center axis extending vertically through the housing block, and the at least one second hydraulic sensor connection is defined on the housing block with horizontal spacing and with vertical spacing compared to the first hydraulic sensor connection, wherein the first hydraulic sensor connection is disposed remote from the wheel brake hydraulic connections of the vehicle brake system, relative to the at least one second hydraulic sensor connection, wherein each of the respective blind bores extends in a common sectional plane through the housing block and each of the respective blind bores is oriented horizontally and/or vertically, and wherein the first hydraulic sensor connection and the at least one second hydraulic sensor connection are defined in a common exterior of the housing block.

13. The hydraulic assembly as defined by claim 12, wherein the respective blind bore of the at least one second hydraulic sensor connection hydraulically connects a respective wheel brake hydraulic connection with a first receptacle of the plurality of receptacles and a second receptacle of the plurality of receptacles, each of the first and second receptacles has a solenoid valve, the first receptacle is configured to receive a solenoid valve that controls pressure buildup in a respective wheel brake and the second receptacle is configured to receive a solenoid valve that controls pressure reduction of the respective wheel brake.

14. The hydraulic assembly as defined by claim 12, wherein the receptacles are defined in the common exterior of the housing block.

15. The hydraulic assembly as defined by claim 14, wherein the first hydraulic sensor connection is in fluid communication with one of the hydraulic master cylinder connections on the housing bloc, and each of the at least one second hydraulic sensor connections is in fluid communication with one of the wheel brake hydraulic connections of the housing block.

16. The hydraulic assembly as defined by claim 15, wherein the first hydraulic sensor connection and the at east one second hydraulic sensor connection communicate with different hydraulic master cylinder connections.

17. A hydraulic assembly for a vehicle brake system with traction control, comprising:
a housing block having a plurality of receptacles defined therein, the receptacles being configured to receive hydraulic components for regulating brake pressure at wheel brakes of the vehicle brake system;
the housing block further defining a plurality of bores configured to carry pressure fluid and place the receptacles in fluid communication with at least one brake circuit;
the housing block further defining a first hydraulic sensor connection for a first pressure sensor configured to detect hydraulic pressure in a hydraulic portion of the vehicle brake system; and
the housing block also defining at least one second hydraulic sensor connection for a second pressure sensor,
wherein the first hydraulic sensor connection is disposed on a closed end of a first blind bore of the plurality of bores and each of the at least one second hydraulic sensor connections are disposed on a closed end of a respective second blind bore of the plurality of bores,
wherein the first blind bore places the first hydraulic sensor connection in fluid communication with a first receptacle of the plurality of receptacles,
wherein the respective second blind bore places a respective hydraulic sensor connection of the at least one second hydraulic sensor connection in fluid communication with a respective receptacle of the plurality of receptacles, and
wherein the first blind bore is defined within the housing block at an essentially right angle with respect to the second blind bore.

18. A hydraulic assembly for a hydraulic vehicle brake system with traction control, comprising:
a housing block having a plurality of receptacles defined therein, the receptacles being configured to receive hydraulic components for regulating brake pressure at wheel brakes of the vehicle brake system;
the housing block further defining a plurality of bores configured to carry pressure fluid and place the receptacles in fluid communication with at least one brake circuit;
the housing block further defining a first hydraulic sensor connection for a first pressure sensor configured to detect hydraulic pressure in a hydraulic portion of the vehicle brake system; and
the housing block also defining at least one second hydraulic sensor connection for a second pressure sensor,
wherein a group of hydraulic sensor connections include the first hydraulic sensor connection and the at least one second hydraulic sensor connection,
wherein each hydraulic sensor connection of the group of hydraulic sensor connections is disposed on a closed end of a respective blind bore of the plurality of bores, the respective blind bore being configured to carry pressure fluid,
wherein the respective blind bore places a respective hydraulic sensor connection of the group of hydraulic sensor connections in fluid communication with a respective receptacle of the plurality of receptacles, and
wherein the respective blind bore of the at least one second hydraulic sensor connection hydraulically connects a respective wheel brake hydraulic connection with a first receptacle of the plurality of receptacles and a second receptacle of the plurality of receptacles, each of the first and second receptacles has a solenoid valve, the first receptacle is configured to receive a solenoid valve that controls pressure buildup in a respective wheel brake and the second receptacle is configured to receive a solenoid valve that controls pressure reduction of the respective wheel brake.

* * * * *

UNITED STATES PATENT AND TRADEMARK OFFICE
CERTIFICATE OF CORRECTION

PATENT NO. : 8,523,295 B2
APPLICATION NO. : 12/681462
DATED : September 3, 2013
INVENTOR(S) : Bareiss et al.

Page 1 of 1

It is certified that error appears in the above-identified patent and that said Letters Patent is hereby corrected as shown below:

In the Claims:

In column 7, lines 49-50, in claim 16, please replace

"the at east one second hydraulic sensor connection communicate"

with

--the at least one second hydraulic sensor connection fluidly communicate--

Signed and Sealed this
Third Day of June, 2014

Michelle K. Lee
*Deputy Director of the United States Patent and Trademark Office*